(12) United States Patent
Lasser et al.

(10) Patent No.: US 8,332,574 B2
(45) Date of Patent: Dec. 11, 2012

(54) METHOD FOR EFFICIENT STORAGE OF METADATA IN FLASH MEMORY

(75) Inventors: Menahem Lasser, Kohav Yair (IL); Mark Murin, Kfar Saba (IL)

(73) Assignee: Sandisk IL Ltd., Kfar Saba (IL)

( * ) Notice: Subject to any disclaimer, the term of this patent is extended or adjusted under 35 U.S.C. 154(b) by 706 days.

(21) Appl. No.: 12/102,063

(22) Filed: Apr. 14, 2008

(65) Prior Publication Data

US 2008/0270730 A1 Oct. 30, 2008

Related U.S. Application Data

(60) Provisional application No. 60/914,766, filed on Apr. 30, 2007.

(51) Int. Cl.
*G06F 12/00* (2006.01)

(52) U.S. Cl. ........ 711/103; 711/105

(58) Field of Classification Search ........ 711/163, 711/103
See application file for complete search history.

(56) References Cited

U.S. PATENT DOCUMENTS

| | | | |
|---|---|---|---|
| 7,012,835 B2 * | 3/2006 | Gonzalez et al. | 365/185.11 |
| 2005/0144357 A1 * | 6/2005 | Sinclair | 711/103 |
| 2006/0039196 A1 * | 2/2006 | Gorobets et al. | 365/185.01 |

FOREIGN PATENT DOCUMENTS

| | | |
|---|---|---|
| EP | 0833250 A1 | 4/1998 |
| EP | 1645964 A2 | 4/2006 |
| WO | 02058074 A2 | 7/2002 |

OTHER PUBLICATIONS

English translation of Office Action issued Mar. 21, 2012 in Taiwanese Application No. 097114524, 5 pages.
International Preliminary Report on Patentability issued Nov. 3, 2009, and International Search Report mailed Feb. 5, 2009 in International Application No. PCT/IL2008/000531, 16 pages.

* cited by examiner

*Primary Examiner* — Tuan Thai
*Assistant Examiner* — Ngoc V Dinh
(74) *Attorney, Agent, or Firm* — Toler Law Group, PC

(57) ABSTRACT

User data are stored in a memory that includes one or more blocks of pages by, for one of the blocks, and optionally for all of the blocks, whenever writing any of the user data to that block, writing the block according to a predefined plan for specifying, with respect to each page of that block, a portion of the user data that is to be written to that page. Alternatively or additionally, each page that stores user data has associated therewith a metadatum related to the age of the user data stored therein; and, for one of the blocks, at any time that two or more of the pages of that block store user data, a common value of the metadatum is associated with all such pages.

23 Claims, 4 Drawing Sheets

METHOD FOR EFFICIENT STORAGE OF METADATA IN FLASH MEMORY

This patent application claims the benefit of U.S. Provisional Patent Application No. 60/914,766, filed Apr. 30, 2007

FIELD AND BACKGROUND

Disclosed herein are methods of storing control metadata in flash memory systems.

Flash memory systems have become very common in recent years. Due to certain characteristics of flash memory devices, the handling of memory systems based on such devices is not trivial and requires dedicated software to handle the writing to and reading from these devices, thus simplifying the use of the storage system for the user application. For example, NAND-type flash memory is typically written (also called "programmed") in chunks called "pages" (typically having the size of 512 bytes to 2K bytes). A flash page should not be written to unless the page is previously erased (all bits set to "1"). However, erasing can only be done in chunks called "blocks", with a block typically containing many pages. This significantly complicates the management of the flash memory devices, as data cannot simply be written into a random address without first making sure it is erased, but one cannot arbitrarily erase a target page as its neighboring pages sharing the same block might contain valuable data that should not be erased. Another example of the complexities of using flash memory is the need for error correction. Flash memory cells tend to have occasional errors when being read out and the storage system must provide appropriate mechanisms for correcting the data read out before returning the data to the requesting application.

In order to handle the above difficulties (and some others) it is common to access flash memory systems through a software layer that takes care of all complexities and provides the accessing application a simple-to-use world view. Such software layers are commonly called "flash management systems" or "flash file systems". Typically such software executes within a flash controller dedicated for controlling and managing the flash memory devices or within a host computer accessing the flash memory devices where the software is part of a software driver servicing the storage system.

Flash management systems typically require the storing of metadata (also called "control information") within the flash memory. Such data is essential for deciding on the right policies and activities to be employed by the flash management systems. A most simple example is the storing of the erase count of each of the blocks in the storage system. As there is a desire to level out the usage of blocks across the storage system (as blocks wear out with extended use), it is typical for a flash management system to maintain for each block its number of accumulated erasure cycles and use this data for deciding on the next block to be allocated for writing new incoming data. There are many more examples of metadata stored in flash storage systems, some of them common to most systems and others unique to specific storage systems that employ unique management algorithms. While the present disclosure discusses specific examples of metadata, it should be understood that the methods described herein are equally applicable to all types of metadata that are associated or used with flash memory storage systems, as long as such metadata types comply with the conditions specified elsewhere in this disclosure as benefiting from the methods disclosed herein.

Many of the metadata types commonly used are block-specific. By block-specific it is herein meant that the metadata provide some information that is a characteristic of the block as a whole. The above example of an erase count of a block is block-specific. As a block is the minimal unit of erasure, there is no point in providing an erase count for a single page. There are however metadata types that are page-specific, in the sense that they provide information related only to a specific page, and different pages within the same block may have different metadata values. One common example for page-specific metadata is the error correction parity bits typically stored with each page of user data to enable error correction when reading the page. Obviously the values of these parity bits depend on the specific data stored in a page and therefore must be page-specific. Block-specific metadata are much "cheaper" to handle in flash memory systems than page-specific metadata. This is because block-specific data require just a single entry per each block, while page-specific data require an entry per each page. As the number of pages is typically significantly higher than the number of blocks, the handling of page-specific metadata creates great difficulties for flash management systems. The difficulties exist both in the need for more metadata space within the flash memory devices and in the need for larger amounts of RAM memory in the flash controller or host computer (as the case may be) for storing tables of the metadata values for various pages.

Another example of page-specific metadata is needed by some known methods for improving reading reliability in flash memory systems by adaptively adjusting the reading reference voltages used for reading the flash memory cells. In one such known method the flash management system keeps track of the adjusted read reference voltages successfully used for reading each page the last time it was read. Those reference voltages are then used as a starting point the next time a page is read, thus reducing the number of reading iterations on next reading operations.

The stored last-used reference voltages provide another example of page specific metadata. Even though all pages in a common block are erased at the same time and typically have similar threshold voltage drifting characteristics, their reference voltage metadata values are not necessarily the same. This is because writing time is not necessarily common even though erasing time must be common for all pages in a block. Typically a flash management system directs an incoming stream of consecutive page write requests into sequential pages in a block. If the stream of pages being written at a first date stops at a point that corresponds to a middle of a block and then starts from there at a later date, then the same block would contain some pages written on the first date and some pages written on the second date. In more complex scenarios, and depending on the specific algorithms of the flash management system, a block might contain pages written on more than two dates. In extreme (even though quite unlikely) scenarios, it is even possible to have each page of a block written on a different date. If the host writes pages at random addresses rather then sequentially, the result is even more likely to be many blocks with pages written at different dates.

The amount of drifting of the threshold voltages of cells is strongly dependent on the time of writing. A page written a year ago will typically have a significantly higher drift than a page written an hour ago. Drifting only starts after a page is written. Because of this, reference voltage metadata are considered page-specific metadata in conventional flash management systems. As such, the handling of reference voltage metadata is subject to difficulties similar to those mentioned above—extra space needed in the flash memory devices and extra RAM needed in the flash controller or the host computer. Accordingly, there is a need for improved handling of page-specific metadata.

SUMMARY

There is therefore an advantage to having ways of handling certain page-specific metadata types (such as the read reference voltages) as if they were block-specific metadata, while at the same time not sacrificing the accuracy of the metadata values used by the flash management systems. It is noted that one may attempt to approximate the metadata values of all pages in a block by keeping only the value related to one page of the block and using it as an approximation for all other pages of the same block. But as explained above, there is no guarantee that all pages of the block will have similar value of the metadata, and thus the accuracy of the metadata is compromised. Hence, by handling certain types of page-specific metadata as if they were block-specific metadata, as disclosed herein, the proposed solution improves upon the conventional ways of handling page-specific metadata. This is achieved substantially without sacrificing the accuracy or correctness of the metadata.

In one embodiment, there is provided a method of storing data, including: (a) receiving user data to be stored in a memory that includes at least one block, each block including a plurality of pages; and (b) for one of the at least one block, whenever writing any of the user data to the one block, writing the one block according to a predefined plan for specifying, with respect to each page of the one block, a portion of the user data that is to be written to the each page of that block.

In another embodiment, there is provided a method of storing data, including: (a) storing the data in a memory that includes at least one block, each block including a plurality of pages, each page in which user data are stored having associated therewith a metadatum related to an age of the user data that are stored in the each page; and (b) for one of the at least one block, at any time that at least two pages of the one block have user data stored therein, associating, with all the pages of the one block wherein the user data are stored, a value of the metadatum that is common to all the pages of the one block wherein the user data are stored.

In another embodiment, there is provided a memory device that includes at least one block, each block including a plurality of pages, wherein, for one of the at least one block, whenever user data are written to the one block, the user data are written to the one block according to a predefined plan for specifying, with respect to each page of the one block, a portion of the user data that is to be written to the each page of the one block.

In another embodiment, there is provided a memory device including: (a) a controller, for storing user data in a memory that includes at least one block, each block including a plurality of pages, by, for one of the at least one block, whenever writing user data to the one block, writing the user data to the one block according to a predefined plan for specifying, with respect to each page of the one block, a portion of the user data that is to be written to the each page of the one block.

In another embodiment, there is provided a system including: (a) a nonvolatile memory wherein is stored a driver for a memory device that includes at least one block, each block including a plurality of pages, the driver including code for storing data in the memory device by, for one of the at least one block, whenever writing user data to the one block, writing the user data to the one block according to a predefined plan for specifying, with respect to each page of the one block, a portion of the user data that is to be written to the each page of the one block; and (b) a processor for executing the code.

In another embodiment, there is provided a memory device including: (a) a controller for storing user data in a memory that includes at least one block, each block including a plurality of pages, and for associating, with each page in which user data are stored, a metadatum related to an age of the user data that are stored in the each page; wherein, for one of the at least one block, at any time that at least two pages of the one block have user data stored therein, the controller associates, with all the pages of the one block wherein the user data are stored, at most one common value of the metadatum.

In another embodiment, there is provided a system including: (a) a nonvolatile memory wherein is stored a driver of a memory device that includes at least one block, each block including a plurality of pages, the driver including code for storing user data in the memory device and for associating, with each page of the memory device in which user data are stored, a metadatum related to an age of the user data that are stored in the each page, wherein, for one of the at least one block, at any time that at least two pages of the one block have user data stored therein, all the pages of the one block wherein the user data are stored have associated therewith at most one common value of the metadatum; and (b) a processor for executing the code.

In another embodiment, there is provided a computer-readable storage medium having computer-readable code embedded thereon, the computer-readable code being driver code for a memory device that includes at least one block, each block including a plurality of pages, the computer-readable code including program code for storing data in the memory device by, for one of the at least one block, whenever writing user data to the one block, writing the user data to the one block according to a predefined plan for specifying, with respect to each page of the one block, a portion of the user data that is to be written to the each page of the one block.

In another embodiment there is provided a computer-readable storage medium having computer-readable code embedded thereon, the computer-readable code being driver code for a memory device that includes at least one block, each block including a plurality of pages, the computer-readable code including program code for storing user data in the memory device and for associating, with each page of the memory device in which user data are stored, a metadatum related to an age of the user data that are stored in the each page, wherein, for one of the at least one block, at any time that at least two pages of the one block have user data stored therein, all the pages of the one block wherein the user data are stored have associated therewith at most one common value of the metadatum.

According to one basic method of storing data, user data to store in a memory are received. The memory includes one or more blocks. Each block includes two or more pages. One of the blocks is treated in a special way during the writing of user data. Whenever any of the user data are written to that block, i.e., each and every time user data are written to that block, the block is written according to a predefined plan for specifying, with respect to each page of the block, the portion of the user data that is to be written to that page of that block. Note that the "portion" of user data to be written to a page could be a null portion, i.e., no user data are written to that page. Note also that which physical block of the memory is designated for writing according to the predefined plan could be changed, e.g. for the purpose of wear leveling if the memory is a flash memory, as long as there always is a block that is designated for writing in this manner.

In some embodiments, the specifying of the portion of the user data includes preparing one or more pointers to (a) corresponding location(s) where (a) corresponding portion(s) of the user data is/are located prior to being written to the block that is written according to the predefined plan. This/these location(s) could be in the memory itself, in a RAM of a host of the memory, etc.

In some embodiments, in which the user data are received from a host of the memory, the host may substitute new user data for the portion of the user data that has been specified to be written to one of the pages of the block that is written according to the predefined plan. In some of these embodiments, the specified portion of the user data is written to that block despite the substitution. In others of these embodiments, the writing of the user data is terminated instead of writing any of the planned user data to the block. Optionally, the writing of the user data is terminated only if the host substitutes the new user data after the specified portion of the user data already has been written to the page, i.e., only if the host tries to change data that already have been written to the block.

In some embodiments, a set, of user data, that is at most as large as the data capacity of the block that is written according to the predefined plan, is stored in a cache. The writing according to the predefined plan includes copying that set of user data to the block.

In some embodiments, the memory includes a plurality of blocks, all of which are written according to predefined plans for specifying user data to be written to each of their pages whenever user data are written thereto.

A memory device that corresponds to the first basic method includes one or more blocks of pages. User data are written to the blocks in accordance with the first basic method for one of the blocks, whenever user data are written to that block, the user data are written according to a predefined plan for specifying, with respect to each page of that block, a portion of the user data that is to be written to that page of the block.

Another memory device that corresponds to the first basic method includes a controller that uses the method to manage a memory that includes one or more blocks of pages, and normally also includes the memory.

A system that corresponds to the first basic method includes a nonvolatile memory wherein is stored a driver for a memory device that includes one or more blocks of pages. The driver includes code for using the method to manage the memory device. The system also includes a processor for executing the code. Normally, the system also includes the memory device.

A computer-readable storage medium that corresponds to the first basic method has embedded thereon computer-readable code of a driver for a memory device that includes one or more blocks of pages. The driver includes code for using the method to manage the memory device.

According to another basic method of storing data, the data are stored in a memory that includes one or more blocks. Each block includes a plurality of pages. Each page in which user data are stored has associated therewith a metadatum related to an age of the user data that are stored in that page. For one of the blocks, at any time that two or more of the pages of the block have user data stored therein, a value of the metadatum that is common to all the pages of the block that have user data stored in them is associated with all such pages of the block. As in the first basic method, which physical block of the memory has a common metadatum value associated with all of its pages in this manner could be changed, e.g. for the purpose of wear leveling if the memory is a flash memory, as long as there always is a block that has such a common metadatum value associated in this manner with all of its pages that store user data.

In some embodiments, the storing of the user data includes, for (one of) the block(s), whenever writing any of the user data to that block, writing the block according to a predefined plan for specifying, with respect to each page of the block, a portion of the user data that is to be written to that page of the block.

In some embodiments, the associating of the common metadatum value with the pages that store user data includes writing the common value of the metadatum in a respective location in the memory. For example, e.g. in a NAND flash memory, the respective location could be in the block that includes the pages that store the user data. Alternatively, e.g. in a NOR flash memory that reserves one of its blocks for storing a table of common metadatum values of other blocks, the respective location is outside the block that includes the pages that store the user data. Especially in all these embodiments, but also in the method generally, the method optionally includes replacing the common metadatum value with a revised version thereof by writing the revised version in a respective location thereof in the memory. The respective location where the revised value is written could be different from the respective location of the value that is being replaced. For example, in a NOR flash memory, the revised value could be written to a different page of the table of common metadatum values, and in a NAND flash memory, the original and revised values could be written to the control data portions of two different pages of the block in which the user data are stored. Alternatively, the respective location where the revised value is written is the same as the respective location of the value that is being replaced. For example, in a NAND flash memory, the same control data byte of the first pages of the block could always be used for storing the common metadatum value.

In some embodiments, the metadatum is related to a reference voltage for reading the user data. For example, the metadatum could be the read reference voltage itself, or the metadatum could be a quantity such as an offset for computing the read reference voltage, or the metadatum could be a flag that indicates whether to use a default read reference voltage.

In some embodiments, the method also includes reading at least a portion of the user data that are stored in the two or more pages, in accordance with the common value of the metadatum.

A memory device that corresponds to the second basic method includes a controller that uses the method to manage a memory that includes one or more blocks of pages, and normally also includes the memory.

A system that corresponds to the second basic method includes a nonvolatile memory wherein is stored a driver for a memory device that includes one or more blocks of pages. The driver includes code for using the method to manage the memory device. The system also includes a processor for executing the code. Normally, the system also includes the memory device.

A computer-readable storage medium that corresponds to the second basic method has embedded thereon computer-readable code of a driver for a memory device that includes one or more blocks of pages. The driver includes code for using the method to manage the memory device.

BRIEF DESCRIPTION OF THE DRAWINGS

Various embodiments are described herein, by way of example only, with reference to the accompanying drawings, wherein.

DESCRIPTION OF THE PREFERRED EMBODIMENTS

Figure 1:
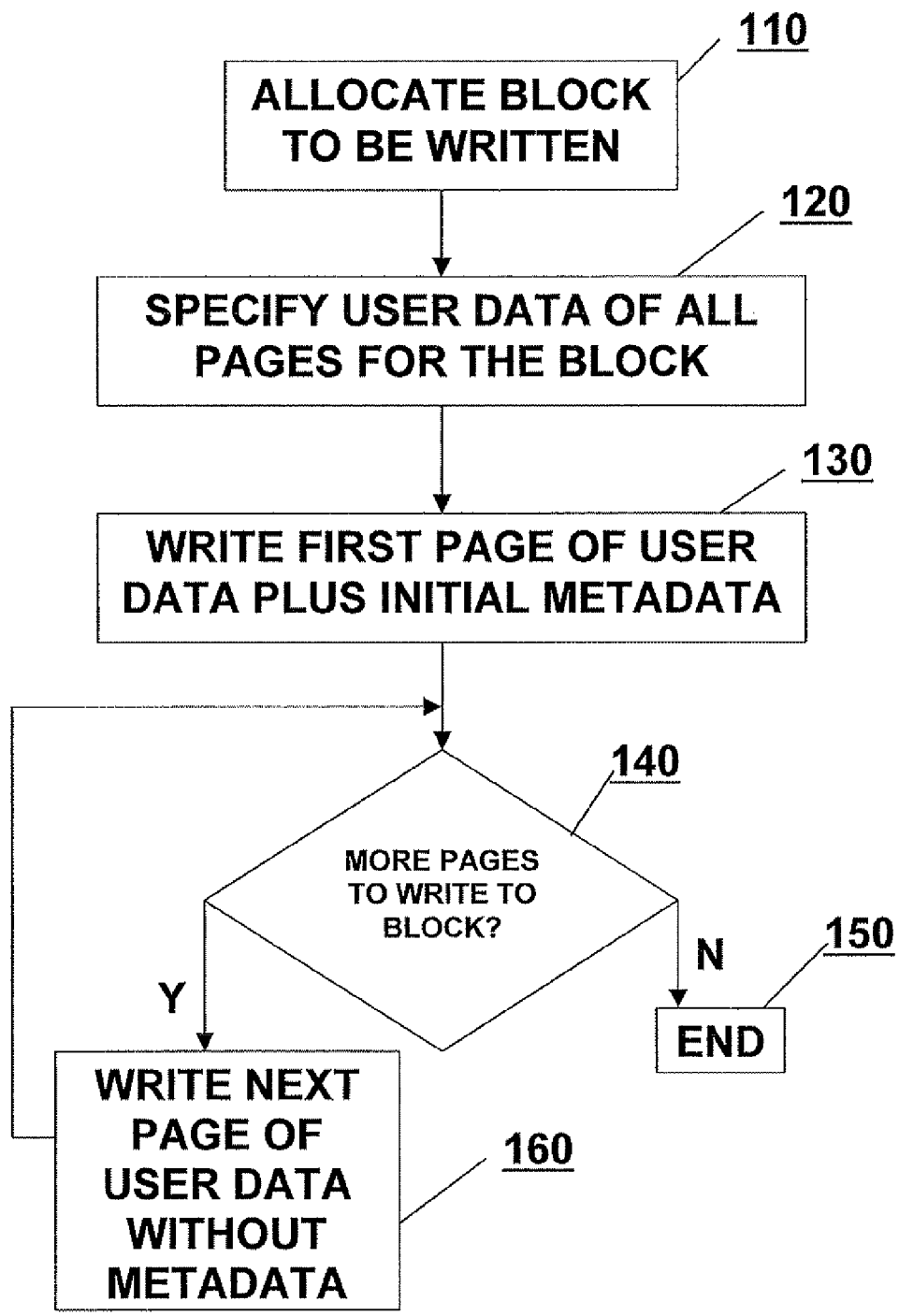
FIG. 1 is a flow chart of a procedure for writing all the pages of user data of a block so that the write-time-dependent metadata values of the first page also apply to the rest of the pages.

The principles and operation of control metadata storage in a flash memory system may be better understood with reference to the drawings and the accompanying description.

Various embodiments of methods and systems disclosed herein are particularly useful for a certain class of metadata types. This is the class of page-specific metadata that are dependent on page writing time. Such metadata are called herein "write-time-dependent metadata". The read reference voltages metadata presented above as one example of page-specific metadata are write-time-dependent, as the value of the drift, and consequently the value of the read reference expected to offset the drift, is dependent on the time of writing the page. However not all page-specific metadata are write-time-dependent. The error correction parity bits presented above as another example of page-specific metadata do not depend on the time of writing the page but rather on the data contents of the page. Thus these bits are not write-time-dependent.

The approach disclosed herein is implemented in various embodiments by constructing the flash management system in a way that all pages of user data common to a particular block are always written substantially simultaneously. Once it is safe to assume that pages of user data that share a block also share the same write time, we also may assume that they share the metadata values of all write-time-dependent metadata types. Then we can treat such metadata types as if they are block-specific rather than page-specific, gaining the advantages of block-specific metadata—i.e., significantly smaller metadata space within the flash devices and significantly smaller RAM tables.

In order to write all pages of a block substantially simultaneously, at the time of writing the first page of user data into a block, it should be already specified, according to a predefined plan, what user data will be written into all other pages of that block. It should be understood that this does not mean that all user data destined to be written in the block must explicitly be pointed to or listed in an explicit list. It is enough that the logic of the flash management system is sufficiently deterministic so that a person or machine understanding the logic and knowing the exact current state of the storage system would be able to calculate, at the time of writing the first page of user data into the block, which user data will eventually be written to all pages of the block according to the plan.

It should be noted that certain future events originating by the host computer might change that predefined plan. For example, a future overwrite of a page by new data from the host might cause the flash management system to abort the predefined plan and abandon the writing of the block. Still, this does not make the flash management system considered as one that does not have a predefined plan. The only requirement for a system to be considered of the "predefined plan" type is that at the time of writing the first page of user data into a block, there is already a predefined default plan, of what other user data to put in all other pages of the block, that will be followed unless future events originated by the host will abort the plan.

Typically when a flash management system is set to always write all pages of a block according to a predefined default plan, writing times of different pages of the same block will differ from each other by very little amount, which is insignificant for the accuracy of the write-time-dependent metadata. Such differences will typically be less than one second, or several seconds in extreme cases on very slow storage systems.

It should be noted that by saying that the user data of all other pages are known at the time of writing the user data of a first page of the block, it is not meant to require that each block is fully written with user data in all its pages. It is only required that for those pages which are to be written into the block in the current phase, their user data must already be specified. But it is acceptable that certain pages will not be written to and will be left empty (that is—with no user data), until the block is erased.

It should also be noted that in order for the contemplated methods described herein to be applicable to a flash storage system, it is not required that all blocks of the storage system are made to be written with user data according to a predefined plan. Some blocks may be used by the flash management system in other ways—for caching incoming data, for keeping tables of metadata, for partitions having different characteristics than the main storage area, etc. The contemplated methods disclosed herein would then apply to that storage area portion of the storage system as to which the flash management system would make sure that all blocks targeted for writing user data thereto are written according to a predefined plan that specifies the user data to be written.

Flash management systems that can be made to adhere to the "predefined plan" standard can be of the following two classes:

A. Caching flash management systems—Some flash management systems store incoming data in a relatively fast cache area, and at a later time copy the data from the cache to its target location in the main storage area.

B. Non-caching flash management systems—Most flash management systems in use today store incoming data in the target location in the main storage area. At a later stage, after portions of the data have been updated by the host, those systems conduct one form or another of garbage collection, condensing valid data and recovering areas containing old superseded data.

Various embodiments of the methods and systems disclosed herein are generally useful for caching flash management systems, as the feature of "predefined" writing of blocks is easy to achieve in such systems. When filling a block in the main storage system, it can easily be guaranteed that all user data for the block are already specified at the time of starting filling the block with user data—typically the user data are already in the cache.

However, such methods and systems disclosed herein are also useful and applicable to non-caching flash management systems. In such systems care must be taken to avoid deviation from the "predefined plan" block writing condition, and this might somehow affect the efficiency of the system. For example, a block that was started to be filled while only a portion of its user data are available, must not be completed at a later date when the rest of the data are available. Instead, the physical pages of the block not written at the first date must be skipped by the predefined plan and not be used. In spite of this extra complexity, it is still the case that the benefits of the methods disclosed herein typically outweigh the disadvantages, and this makes it advantageous to use the methods disclosed herein even in non-caching flash management systems.

Specific exemplary embodiments are described below. It is to be understood that the scope of the appended claims is not limited to the exemplary embodiments disclosed. It should also be understood that not every feature of the presently disclosed methods, devices and computer-readable codes for managing flash memory storage systems is necessary to implement a method, a device or a computer-readable medium as claimed in any particular one of the appended claims. Various elements and features of devices are described to fully enable the appended claims. It should also be understood that throughout this disclosure, where a process or method is shown or described, the steps of the method may be performed in any order or simultaneously, unless it is clear from the context that one step depends on another step being performed first.

Referring now to the drawings, FIG. 1 is a flow chart of a writing procedure designed to make a flash management system compatible with the requirement to write its blocks substantially simultaneously.

When the logic of the flash management system decides to allocate a new block for writing (110), all user data destined for the block are specified (120). When the first page is written to the block (130), an initial value is set for the metadata associated with that page, a value that will serve the whole block from now on. In the context of the reading reference voltage metadata example, this means storing an initial value of "no correction of reference voltage". The metadata value may be physically stored within the associated block (for example in the extra area of the first page), or it may be stored in a separate table combining the corresponding metadata values of all blocks. In the case of the reading reference voltage metadata example it makes more sense to store the value outside the block, as that specific information is useful for correct reading of the block's pages and therefore it is more logical not to require reading the block in order to obtain this value.

Next all the other pages of the block are written one by one (140, 150, 160), but those pages are written without the need to compute or store additional metadata. The already stored value associated with the first page will serve also for them.

Figure 2:
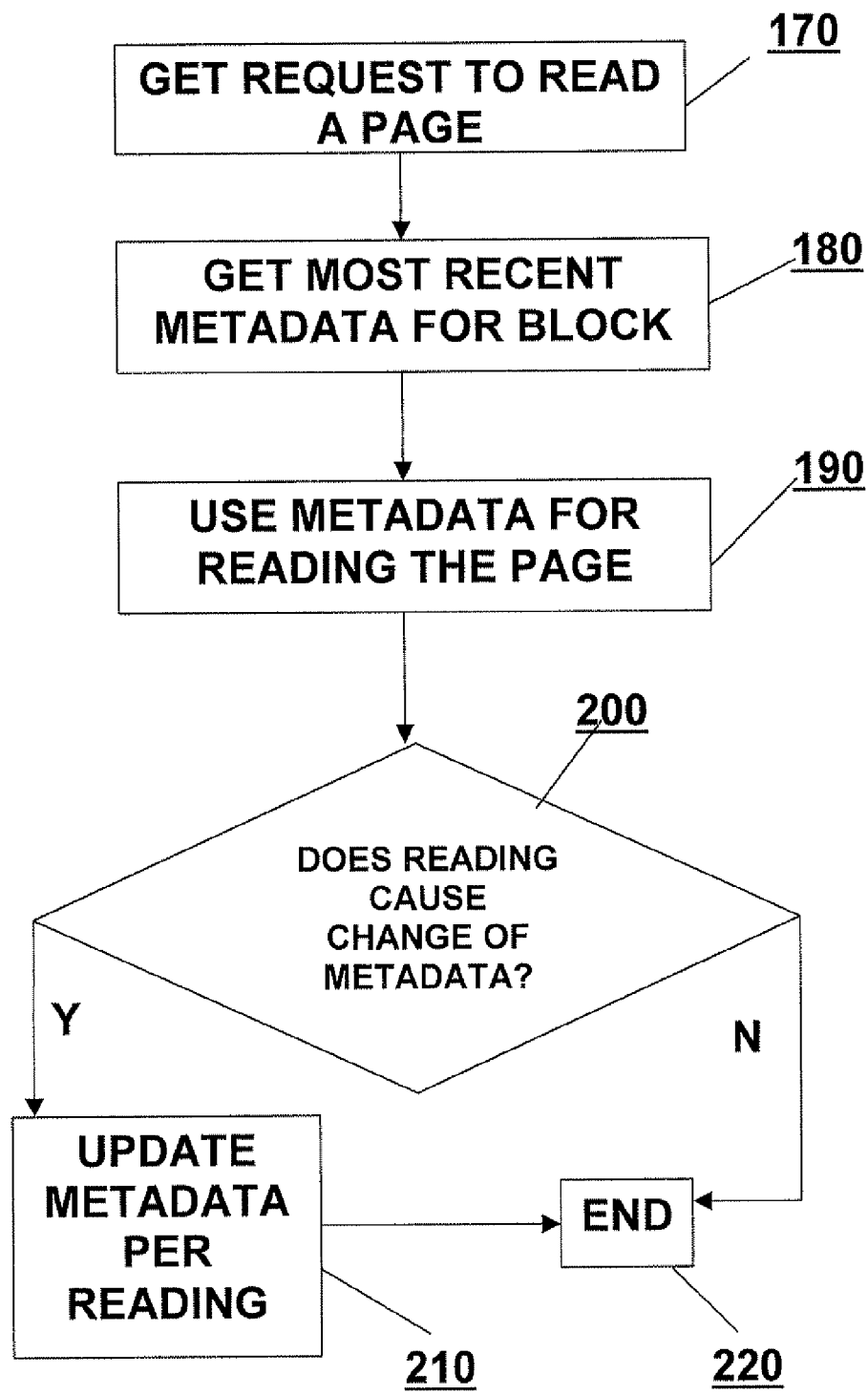
FIG. 2 is a flow chart of a reading procedure that corresponds to the writing procedure of FIG. 1.

FIG. 2 is a flow chart of a reading procedure that corresponds to the writing procedure of FIG. 1. This reading procedure is designed to take advantage of the common value of the metadata, considered to be associated with all pages of a block.

When a request to read a page is received (170), the flash management system retrieves the metadata value associated with the block containing the requested page (180). According to where the metadata are stored, the retrieval may be from the requested page, from a different page (typically the first page) of the same block or from a global table serving all blocks. Note that it is not important if the requested page is the first page of the block or any other page of the block. Then the retrieved metadata value is used by the flash management system for reading the page (190). In the context of the reading reference voltage metadata example, this translates to performing the reading of the requested page using the retrieved setting of read reference voltage.

Next the flash management system determines whether the metadata should be updated following the read operation (200). In the context of the reading reference voltage metadata example this translates to checking whether the retrieved setting of reference voltage indeed resulted in an immediate successful reading of the requested page, or maybe there was a need to do some iterations by changing the reference voltage to account for (further) drifting of the cells' threshold voltages. If indeed such iterations were required, a new value for the metadata must be stored, one that corresponds to the last reading. The new value is stored to the same location from which the previous value was retrieved (210).

Next time a page is requested to be read from that block, the same process will repeat itself. However, the metadata value that will be used this time will be the updated value calculated following the last reading and not the original one.

There is an important additional advantage gained as a result of the above procedure, which is most noticeable when the calculation of a new metadata value is expensive in time or in other resources. Using again the reading reference voltage metadata as an example, it can be noted that the determination of a new reference voltage value is time-consuming. The system has to iteratively read a page again and again, attempting to correct errors in the data in each iteration until it succeeds in getting error-free data. If the reference voltage metadata would have been independently stored for each page, that cost would have been paid for every page.

But consider how a system that uses the procedure described above handles this. Suppose a block was written at a certain date. The initial metadata value is set at time of writing to "no offset". Suppose 6 months later a host application requires to read the data of all pages of the block, and also suppose a significant drift had occurred in the cells of the block. At first the application will ask to read the first page. As the associated metadata indicates no offset, the reading will be attempted using the default reading reference voltage. The initial reading might fail, requiring the slow iterative process of reference adjustments. Eventually the error correction will succeed, the data will be provided to the requesting application and a new value for the metadata will be stored. So the first page read out of the block after a long period of inactivity will suffer the full hit of the iterations cost.

Now the host application asks for the second page. According to the procedure described above the flash management system retrieves the value just updated and applies it to this new request. Therefore this new request starts already its reading attempt at the right setting and immediately succeeds, paying no penalty of iterations. The same is now the case for all other pages of the block, read one after the other. If, for example, a single iteration of reading takes 50 microseconds and reading without prior knowledge of the correct reference voltage setting takes 4 iterations, then reading the first page consumes 200 microseconds and reading all the other pages consumes 50 microseconds each. If a block contains 128 pages, then the total time of reading the block is (200+127× 50) 6,550 microseconds, or on average approximately 51 microseconds per page. This should be compared with the heretofore known procedure of assigning each page with its own value of read reference voltage metadata, that results in a cost of 200 microseconds per page when reading the block after a long period of inactivity.

The above advantage is in addition to the advantages already discussed above of saving space in the flash devices and in the RAM of the controller or the host.

Figure 3:
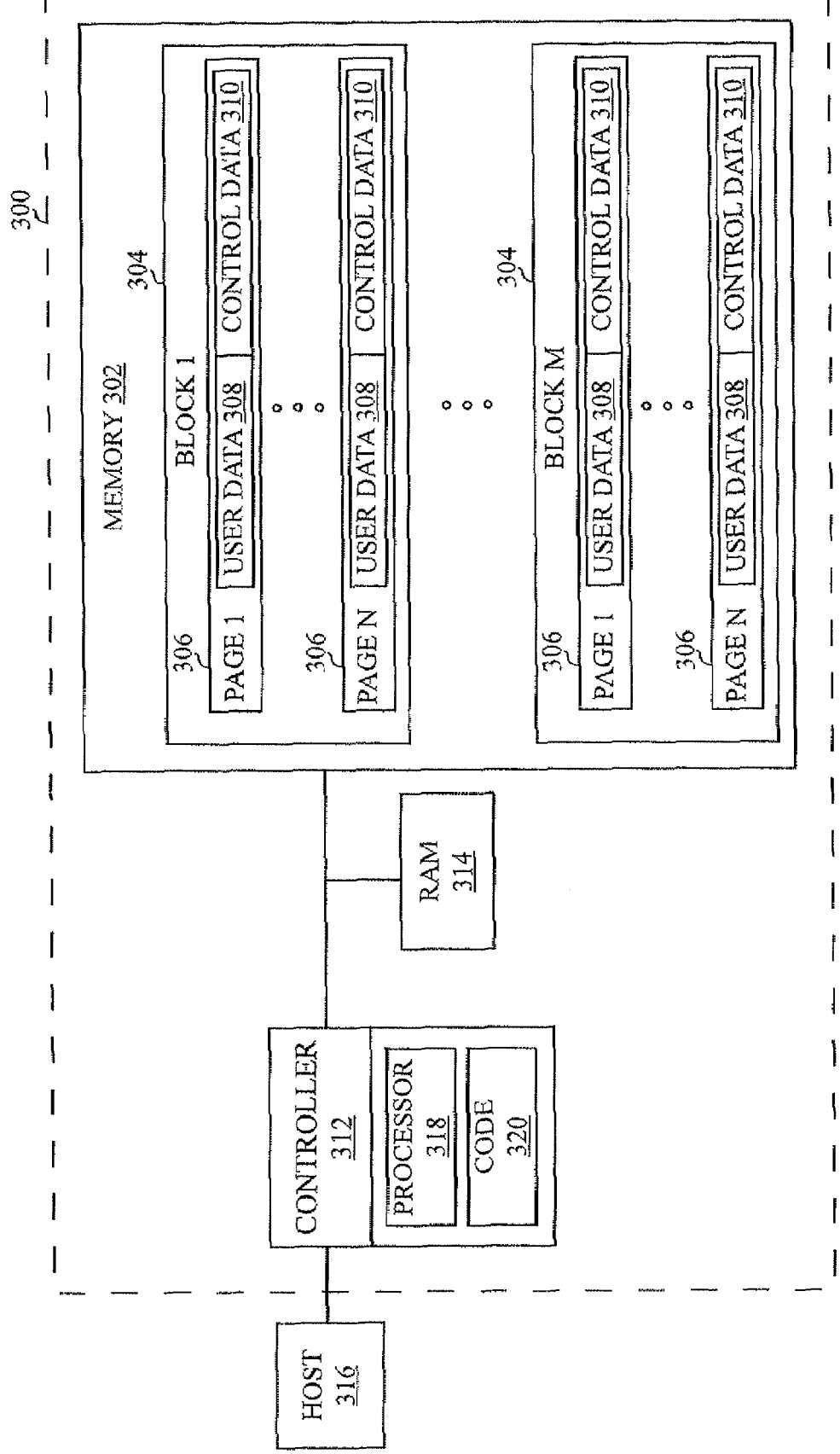
FIG. 3 is a high-level block diagram of a flash memory device that writes and reads user data as illustrated in FIGS. 1 and 2.

FIG. 3 is a high-level block diagram of a flash memory device 300 interacting with a host 316. Flash memory device 300 includes a controller 312, a RAM 314 and a flash memory 302. Flash memory 302 includes a plurality of flash memory cells arranged in M blocks 304. Each block 304 includes N pages 306. Each page 306 includes a user data area 308 for storing user data and a control data area 310 for storing metadata. Controller 312 manages memory 302 with the help of RAM 314. In particular, controller 312 writes user data to designated blocks 304 of memory 302 as illustrated in the flow chart of FIG. 1 and reads user data from those designated blocks 304 of memory 302 as illustrated in the flow chart of FIG. 2. Controller 312 may be implemented using any combination of hardware (for example, including a microprocessor and optionally volatile memory such as RAM (in place of or in addition to RAM 314) or registers), firmware and/or software (for example, computer code that is stored in volatile or non-volatile memory and is executable by a microprocessor). Among the hardware/firmware configurations that are suitable for controller 312 are, as examples, Application-Specific Integrated Circuits (ASIC), Field-Programmable Gate Arrays (FPGA) and Field-Programmable Logic Arrays (FPLA).

Figure 4:
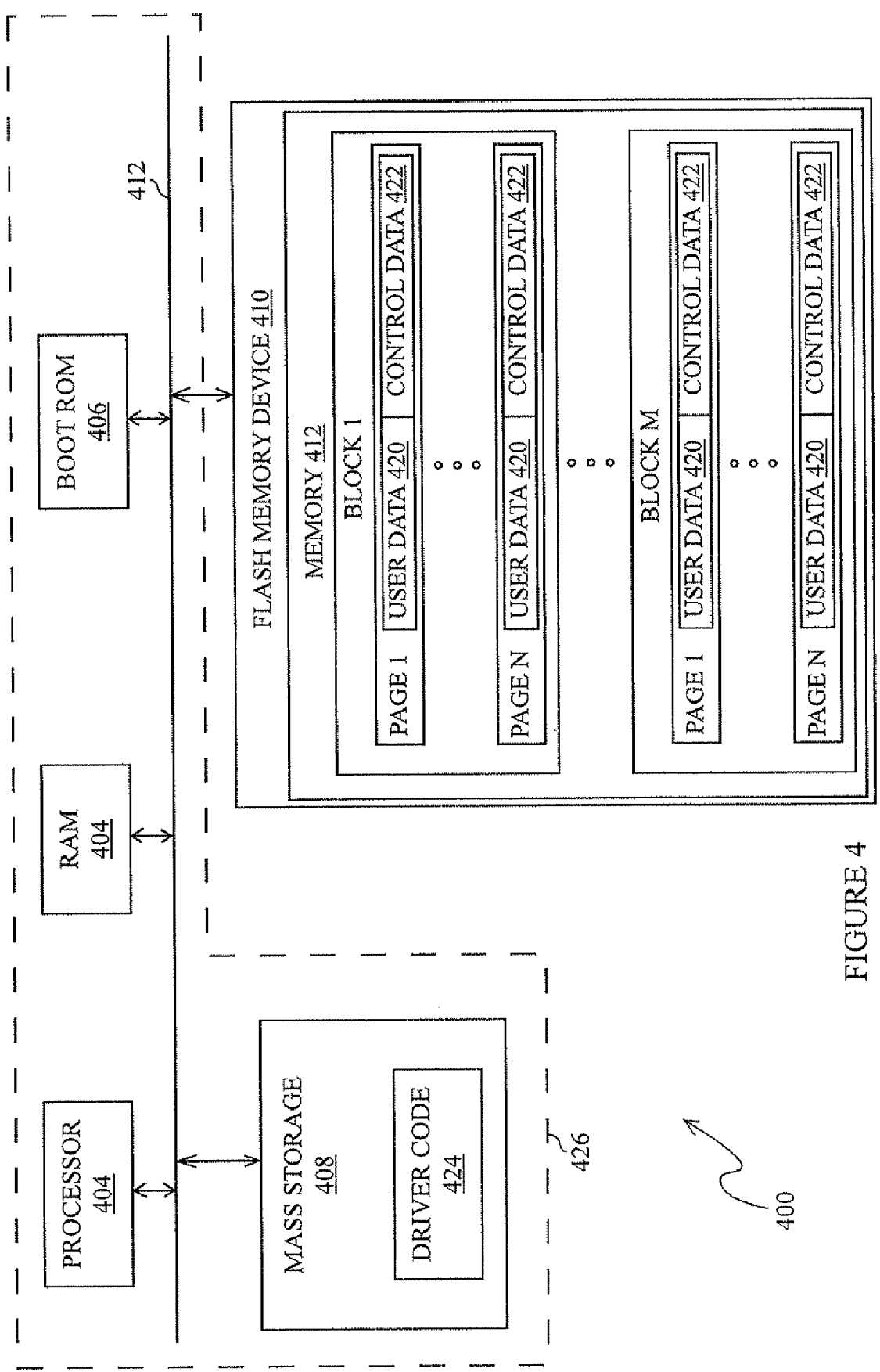
FIG. 4 is a high-level block diagram of a system that writes user data to its flash memory as illustrated in FIG. 1 and reads user data from its flash memory as illustrated in FIG. 2.

FIG. 4 is a high-level block diagram of a system 400. System 400 includes a processor 402 and four memory devices: a RAM 404, a boot ROM 406, a mass storage device (hard disk) 408 and a flash memory device 410, all communicating via a common bus 412. Flash memory device 410 includes a flash memory 414 that, like memory 302 of flash memory device 300, includes a plurality of flash cells arranged in M blocks 416. Each block 416 includes N pages 418. Each page 418 includes a user data area 420 for storing user data and a control data area 422 for storing metadata. Flash memory device 410 lacks its own controller. Instead, the functionality of controller 312 is emulated by flash memory driver code 424 that is stored in mass storage device 408 and that is executed by processor 402. Driver code 424 also interfaces between user applications executed by processor 402 and flash memory device 410. Driver code 424 typically is included in operating system code for system 400 but also could be freestanding code.

The components of system 400 other than flash memory device 410 constitute a host 426 of flash memory device 410. Mass storage device 408 is an example of a computer-readable storage medium bearing computer-readable driver code for implementing the methods described herein. Other examples of such computer-readable storage media include read-only memories such as CDs bearing such code.

A limited number of embodiments of methods for storing control metadata of a flash memory, and of a device and system that use the methods, have been described. It will be appreciated that many variations, modifications and other applications of the methods, device and system may be made.

What is claimed is:

1. A method of storing data, comprising:
   in a data storage device with a memory that includes a plurality of blocks, performing:
      evaluating a data writing schedule to determine whether user data is to be written to multiple pages of a block;
      in response to determining that the data writing schedule indicates that the user data is to be written to multiple pages of the block, storing a metadatum in the memory as a block-specific metadatum, wherein an initial value of the block-specific metadatum associated with a first page of the multiple pages is written to the memory when the first page is written to the block, wherein a second page of the multiple pages is written to the block after the first page without storing an additional metadatum in the memory; and
      in response to determining that the data writing schedule indicates that the user data is to be written to a single page of the block, storing the metadatum in the memory as a page-specific metadatum.

2. The method of claim 1, wherein the block-specific metadatum is associated with a write condition of a particular page of the block.

3. The method of claim 2, wherein the write condition comprises a write time.

4. The method of claim 3, wherein the write condition corresponds to a reference voltage.

5. The method of claim 1, wherein the block-specific metadatum is related to an age of the user data.

6. The method of claim 1, wherein the block-specific metadatum is written in a first location in the memory, further comprising replacing the block-specific metadatum with a revised version of the block-specific metadatum by writing the revised version of the block-specific metadatum in a second location in the memory, wherein the first location is different than the second location.

7. The method of claim 6, wherein the second location is in a same block as the user data.

8. The method of claim 6, wherein the second location is in a different block than the user data.

9. The method of claim 6, further comprising reading at least a portion of the user data that is written to the multiple pages in accordance with the revised version of the block-specific metadatum.

10. The method of claim 6, wherein the second location in which the revised version of the block-specific metadatum is written is in a table in the memory.

11. A data storage device comprising:
   a controller; and
   a memory that includes a plurality of blocks, wherein the controller is configured to:
      evaluate a data writing schedule to determine whether user data is to be written to multiple pages of a block;
      in response to determining that the data writing schedule indicates that the user data is to be written to multiple pages of the block, store a metadatum in the memory as a block-specific metadatum, wherein an initial value of the block-specific metadatum associated with a first page of the multiple pages is written to the memory when the first page is written to the block, wherein a second page of the multiple pages is written to the block after the first page without storing an additional metadatum in the memory; and
      in response to determining that the data writing schedule indicates that the user data is to be written to a single page of the block, store the metadatum in the memory as a page-specific metadatum.

12. The data storage device of claim 11, wherein the controller is further configured to read at least a portion of the user data that is stored in the multiple pages in accordance with the revised version of the block-specific metadatum.

13. The data storage device of claim 11, wherein the block-specific metadatum is related to an age of the user data.

14. The data storage device of claim 11, wherein the controller is configured to write the block-specific metadatum in a first location in the memory, wherein the controller is further configured to replace the block-specific metadatum with a revised version of the block-specific metadatum by writing the revised version of the block-specific metadatum in a second location in the memory, wherein the first location is different than the second location.

15. The data storage device of claim 14, wherein the second location in which the revised version of the block-specific metadatum is written is in a same block as the user data.

16. The data storage device of claim 14, wherein the second location in which the revised version of the block-specific metadatum is written is in a different block than the user data.

17. A method comprising:
in a data storage device with a memory, performing:
writing a first portion of received user data to a first page of a block of the memory;
in response to determining that the first portion of the received user data is to be written to the first page of the block, storing a first metadatum in the memory as a page-specific metadatum; and
in response to determining that a second portion of the received user data is to be written to a second page of the block, storing the first metadatum in the memory as a block-specific metadatum, wherein the second page is written to the block after the first page without storing an additional metadatum in the memory.

18. The method of claim 17, further comprising writing the second portion of the received user data to the second page of the block.

19. The method of claim 17, wherein the block-specific metadatum is stored in a first location in the memory, and further comprising replacing the block-specific metadatum with a revised version of the block-specific metadatum by storing the revised version of the block-specific metadatum in a second location in the memory, wherein the first location is different than the second location.

20. The method of claim 19, wherein the second location is in the block of the memory.

21. The method of claim 19, wherein the second location is in a different block than the user data.

22. The method of claim 19, further comprising reading the first portion of the user data that is stored in the first page of the block and reading the second portion of the user data that is stored in the second page of the block in accordance with the revised version of the block-specific metadatum.

23. The method of claim 19, wherein the second location in which the revised version of the block-specific metadatum is written is in a table in the memory.

* * * * *